US008775509B2

United States Patent
Dirstine et al.

(10) Patent No.: US 8,775,509 B2
(45) Date of Patent: Jul. 8, 2014

(54) ENHANCED HTTP MESSAGING FOR DEVICES

(75) Inventors: Adam D. Dirstine, Rochester, MN (US);
Christopher Glen Popp, Winona, MN (US)

(73) Assignee: Digi International Inc., Minnetonka, MN (US)

( * ) Notice: Subject to any disclaimer, the term of this patent is extended or adjusted under 35 U.S.C. 154(b) by 154 days.

(21) Appl. No.: 13/561,294

(22) Filed: Jul. 30, 2012

(65) Prior Publication Data

US 2014/0032643 A1   Jan. 30, 2014

(51) Int. Cl.
*H04L 29/06* (2006.01)
*G06F 15/16* (2006.01)

(52) U.S. Cl.
USPC ............ 709/203; 709/206; 709/248; 709/207; 709/238; 709/204; 709/224; 709/227; 709/201; 709/218; 709/232

(58) Field of Classification Search
CPC ......... H04L 29/06; H04L 67/02; H04L 12/28; G06F 15/16
USPC ......... 709/201, 204, 238, 224, 227, 219, 225, 709/202, 232, 218
See application file for complete search history.

(56) References Cited

U.S. PATENT DOCUMENTS

| | | | | |
|---|---|---|---|---|
| 7,558,861 | B1 * | 7/2009 | Qidwai et al. | 709/227 |
| 8,095,599 | B2 * | 1/2012 | Das | 709/206 |
| 8,121,282 | B1 * | 2/2012 | Zhuang et al. | 379/351 |
| 2002/0194262 | A1 * | 12/2002 | Jorgenson | 709/203 |
| 2003/0118160 | A1 * | 6/2003 | Holt et al. | 379/88.12 |
| 2003/0217098 | A1 * | 11/2003 | Bobde et al. | 709/202 |
| 2004/0068574 | A1 * | 4/2004 | Costa Requena et al. | 709/230 |
| 2012/0038459 | A1 * | 2/2012 | Hindus et al. | 340/6.1 |

* cited by examiner

*Primary Examiner* — Jude Jean Gilles
(74) *Attorney, Agent, or Firm* — Fogg & Powers LLC (57) ABSTRACT

Disclosed in some examples is a method for communications between a client and a server using a stateless messaging protocol by transmitting from a client to a server a first message using the stateless messaging protocol; receiving from the server a response message, the response message including an indication of the presence of a second message at the server intended for the client, the indication including message retrieval information; sending a third message from the client to the server including the message retrieval information; and receiving a fourth message from the server, the fourth message including the contents of the second message.

34 Claims, 5 Drawing Sheets

ENHANCED HTTP MESSAGING FOR DEVICES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Digi, International, Inc., All Rights Reserved.

BACKGROUND

Devices may communicate with each other through a communications protocol. A communications protocol is a system of message formats and rules for exchanging those messages in or between computing systems. For example, the communication protocols may define the message contents, how the messages are sent, expected responses, and the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Networked devices such as smart sensors, network routers, or other computing devices often communicate with connectivity servers over a communications protocol to receive configuration information, software updates, notifications, or to transmit data to the connectivity server. Device connectivity servers often utilize custom protocols for these communications which may be complicated and which may place various burdens on the development of devices. For example, each connectivity server may implement a different protocol and thus each time a new device is designed to work with a new connectivity server a new protocol must be implemented.

Generic communication protocols such as HyperText Transfer Protocol (HTTP) are well-known and easy to implement and thus would allow for a more standard approach with easier adoption. Generic protocols however may not be as powerful as custom protocols because they may not be able to fully leverage the device's capabilities. For example, HTTP is limited to primarily being a client driven protocol. Spontaneous messaging from the server is not generally possible. Additionally, and as a consequence of this unidirectional nature, HTTP has very little ability to acknowledge the actual processing of the messages. While HTTP has a status code which is returned after a request, it often is just indicating successful receipt of the message at the server, rather than successful processing of the message. As a result of these limitations, HTTP is generally considered unsuitable for many bi-directional communications systems.

Disclosed in some examples is an enhanced HTTP messaging protocol for devices which may allow for bi-directional communication between the client and the server. Messages to the server from the client are sent using the traditional HTTP PUT or POST operations to the server. Messages from the server to the client are placed in a special mailbox on the server. Upon replying to a subsequent message from the client the server may include a mailbox report in the reply. In some examples, the mailbox report may include a list of messages awaiting the device in its mailbox. The device may then issue subsequent GET HTTP messages to retrieve the messages individually or as a group. In other examples, the mailbox report may include one or more of the messages from the mailbox. The device may also indicate that processing of the message is completed by including a special delete header in a subsequent message which may trigger the server to delete the message from the mailbox. In some examples, the sender of the message (e.g., an upper level application) may become aware that the message was deleted from the device's mailbox through a notification message or by periodically checking the device's mailbox. Deletion of the message may signal the message sender that the message was processed by the recipient client device.

Figure 1:
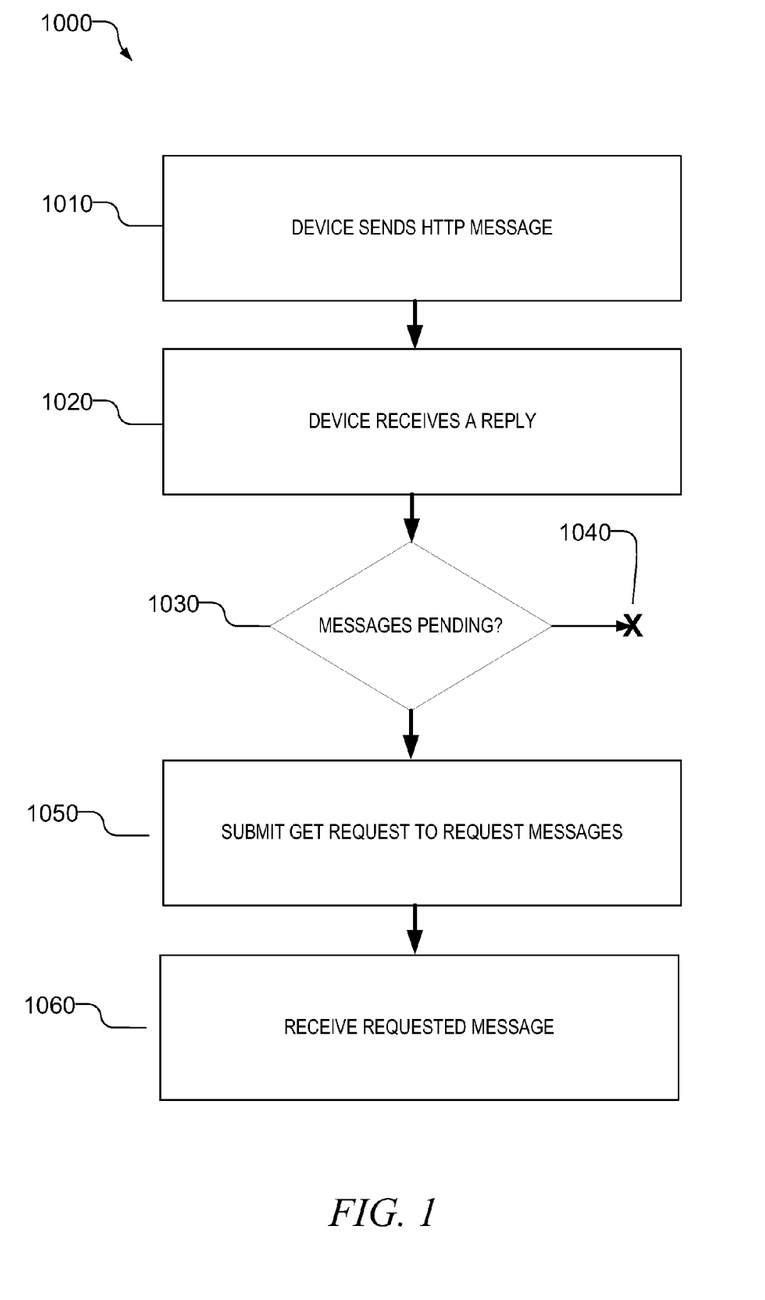
FIG. 1 shows a flowchart of a method of communicating with an enhanced protocol according to some examples of the present disclosure.

Turning now to FIG. 1, an example method 1000 is shown. At operation 1010 a device issues an HTTP message to the server. This message may be for the express purpose of checking the device's mailbox, or may be, for instance, a message sent by higher level applications of the device destined for higher level applications in the server. The contents of the message body may be passed by the server (upon receipt) to the destination higher level applications. This message may be a PUT, a POST, or some other HTTP message.

At operation 1020, the device may receive a reply message from the server indicating both a status of the submission (e.g., "HTTP 200 OK") and a mailbox report. Upon receipt of the reply, the device may check the mailbox report to see if it indicated that there are pending request messages for the device at operation 1030. If there are no messages pending, the flow may end at 1040. If there are messages pending, the device may submit an HTTP GET request message at operation 1050. The HTTP GET message may use information associated with the messages contained in the mailbox report to retrieve one or more of the messages in the device's inbox. For example, the mailbox report may include a Uniform Resource Identifier (URI) or Uniform Resource Locator (URL) for the message which may be used to retrieve the message. For example, the client may send an HTTP GET message with the URL or URI of the message and the server may return that URL/URI in the subsequent response. Along with, or in addition to the URL or URI, other information regarding each message may also be included regarding the messages in the mailbox report. For example, message size, time, sender, or the like. In some examples, upon sending the message to the client in response to the subsequent GET request, the server may delete the message in the device's mailbox. In other examples, the device may have to explicitly delete the item in the mailbox through inclusion of an HTTP delete header embedded in a subsequent message. This later mechanism may provide a signal to any interested higher layer application that the message destined for the device has been received and/or processed by the device.

Figure 2:
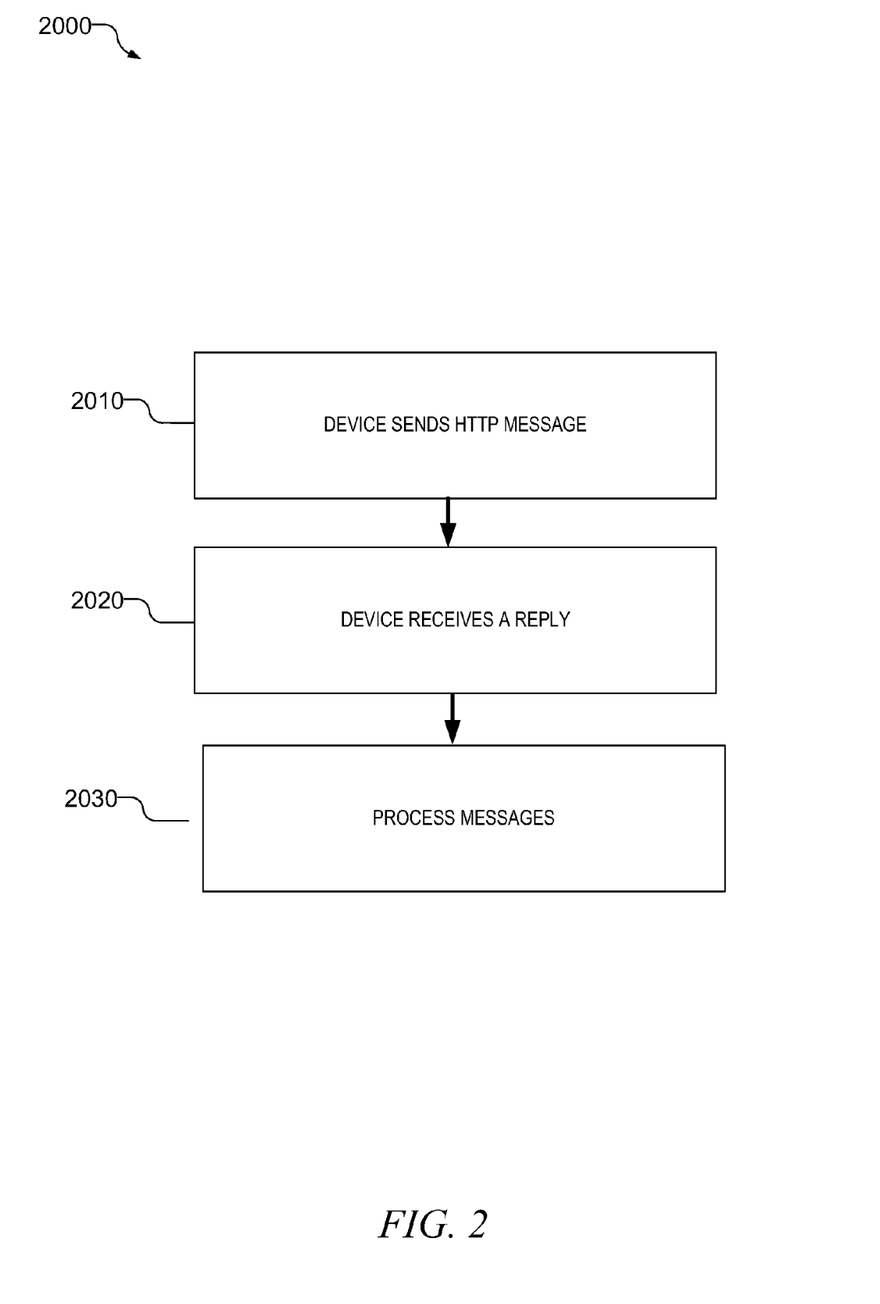
FIG. 2 shows a flowchart of a method of communicating with an enhanced protocol according to some examples of the present disclosure.

Turning now to FIG. 2, another example message flow 2000 is shown. At operation 2010, the device issues an HTTP command (e.g., a PUT, GET, or the like) to send a message to the server. At operation 2020, the device may receive a reply message which includes the mailbox report, which in this example, may include the contents of one or more messages from the inbox of the device.

In some examples, the maximum size of the mailbox report may be predetermined in advance, either through a hard-coded configuration, or through hard coding in the protocol. In other examples, the maximum size may be dynamically configurable by the server and/or the device through messaging. For example, the device may specify the maximum size of the mailbox report (or the maximum number of messages) in the HTTP request which triggered the response which included the mailbox report.

This maximum size may determine how many messages may be sent in the response. In some examples, the total size of all the messages in the device's inbox may be greater than the maximum allowed size of the response message. In these examples, the server may select which messages to send based on one or more of: age (e.g., older messages first or last), size (e.g., bundling lots of smaller messages together so as to deliver the maximum amount of messages), sender (certain senders may be prioritized), priority (e.g., each message may have a priority flag or field and those of higher priority may be delivered first), or the like.

Turning back to FIG. 2, the messages delivered in the response may then be processed by the device at operation 2030. If the number of messages delivered is less than the number of messages in the inbox of the device, in some examples, the response message may include a flag to indicate additional messages are still waiting to be delivered.

In some examples, whether the mailbox report may contain copies of the messages, information on the messages, or both, may be configurable. For example, the type of mailbox report may be predetermined in the protocol, or may be predetermined when the device's mailbox is setup. In other examples, the devices and the servers may configure this on a device-by-device basis. In yet other examples, the server may set a server policy and communicate this to the devices upon configuration.

The examples of FIGS. 1 and 2 showed examples in which the server replied to an unrelated message with a list of pending messages. In some examples, the device may check its mailbox explicitly. For example, the HTTP message may be an HTTP message with no body or with a body explicitly defined to signal the server to send the mailbox report. This message may trigger a reply with a mailbox report. The devices may then periodically poll the server for a mailbox report.

Figure 3:
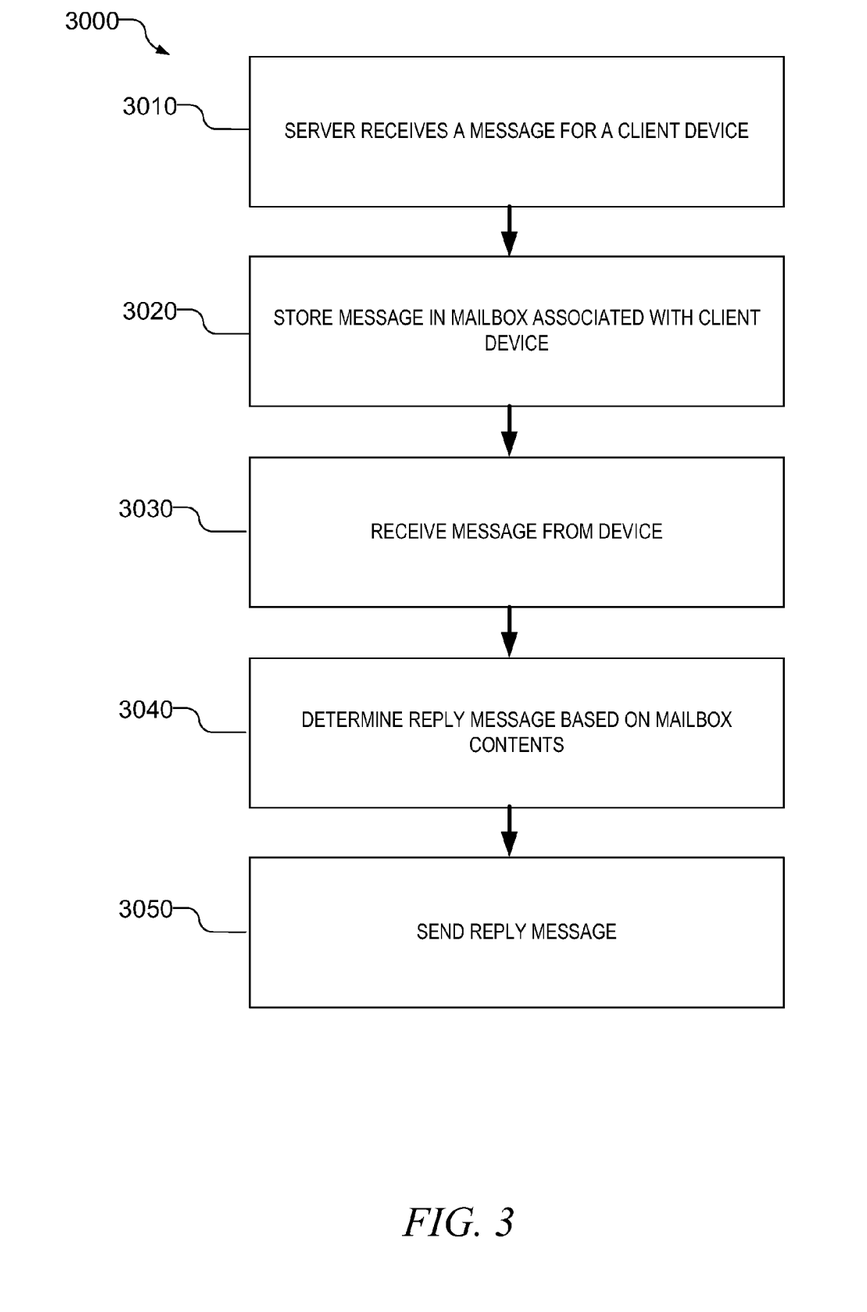
FIG. 3 shows a flowchart of a method of communicating with an enhanced protocol according to some examples of the present disclosure.

An example method 3000 of operating a connectivity server according to some examples of the present disclosure is shown in FIG. 3. At operation 3010, the server may receive a message destined for a particular associated device from a process on the server, or from another associated device. At operation 3020, the server may determine the mailbox of the device and store the received message in that mailbox. The device may be identified to the server based on a number of identifiers including a Medium Access Control (MAC) address, an Internet Protocol Address (IP Address) or some other unique identifier. The device may be previously associated with the server (and thus had a mailbox setup) based upon previous communications (e.g., registering the device with the server—i.e. device discovery), or based upon a manual configuration. In other examples, if the server cannot find a mailbox with the identifier in the message, one will be created. Mailboxes which contain pending messages for long periods of time may be periodically cleaned up (so as to remove mailboxes created through a mistake in addressing by a higher level app).

At operation 3030, the server may receive a message from a device. The server may then determine if there are any pending messages in the device's mailbox at operation 3040. At operation 3050, the server may reply to the client with an HTTP status code and with a mailbox report. In some examples the mailbox report includes a list of messages and meta-data about those messages (including data regarding how to obtain those messages in future requests from the client to the server). In other examples, the mailbox report may include one or more messages for the client.

Figure 4:
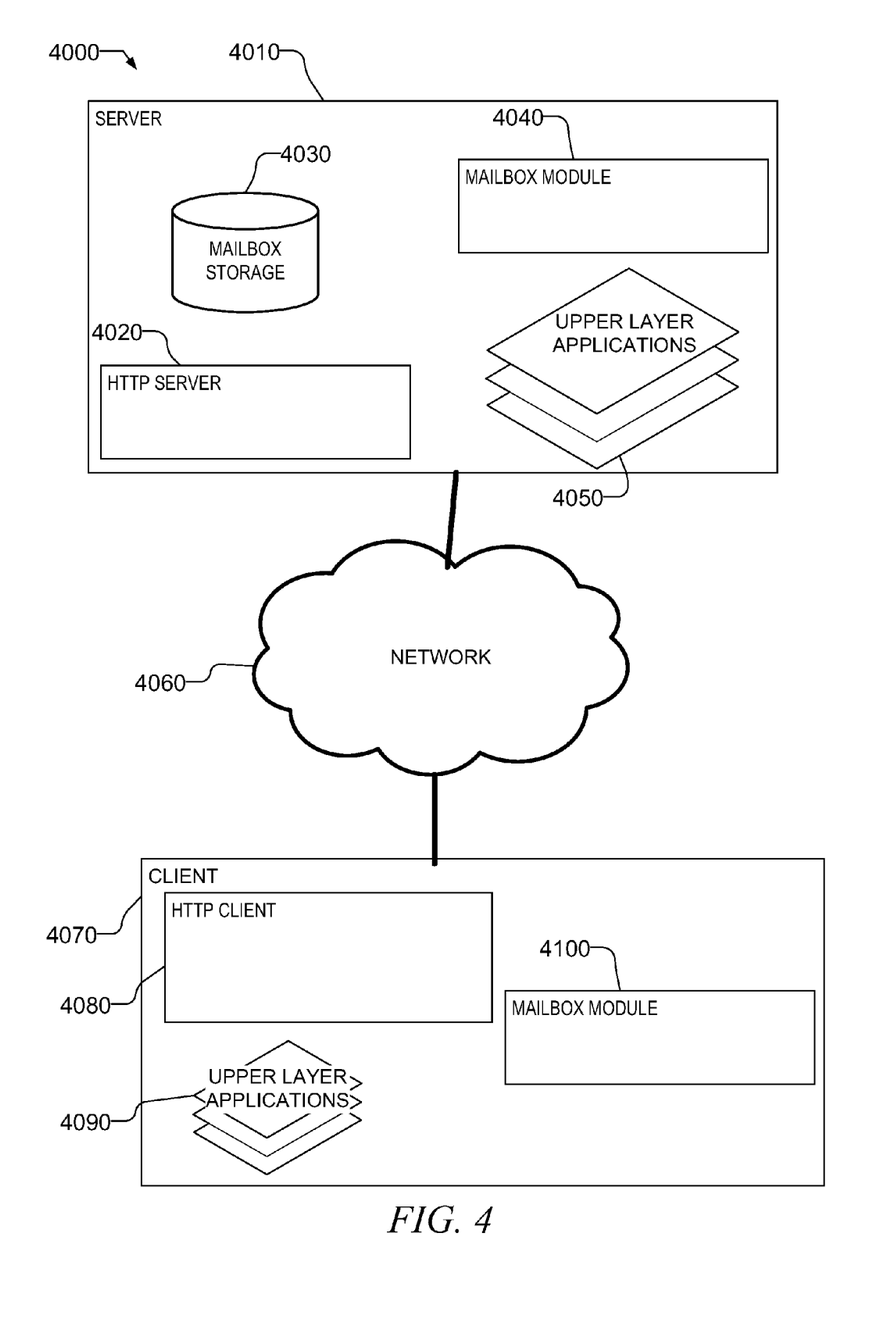
FIG. 4 shows a schematic of an enhanced protocol system according to some examples of the present disclosure.

FIG. 4 shows a system 4000 according to some examples of the present disclosure. Server 4010 includes an HTTP server module 4020. HTTP server module 4020 receives and responds to HTTP requests over network 4060. Network 4060 may be or include a Wide Area Network (WAN), a Local Area Network (LAN), part of the Internet, a wireless network (e.g., such as a $4^{th}$ Generation wireless network, such as a Long Term Evolution (LTE) wireless network, a wireless network configured according to an Institute for Electrical and Electronics Engineers (IEEE) 802.15.4 family of standards (e.g., ZigBee networks), a network according to an IEEE 802.11 family of standards, a mesh network, or the like.

Server 4010 may also include one or more upper layer applications 4050 which may send messages to, and receive messages from devices (e.g., client 4070) through the HTTP server 4020. Applications 4050 send messages to the devices through the use of the client's mailbox. The applications may send the message to the mailbox module 4040 for storage and registration in the target device's mailbox. Mailbox module 4040 may register, setup, and maintain mailboxes for one or more client devices (e.g., client device 4070). These mailboxes may store one or more messages in mailbox storage 4030. In some examples, upon receiving an HTTP message from a client (e.g., client 4070), the HTTP server 4020 may notify the mailbox module 4040 that a client has initiated a communication session with the server 4010. The mailbox module may query the mailbox storage 4030 to determine if any new messages are awaiting the client (e.g., client 4070). If there are new messages, the mailbox module may create the mailbox report (including various metadata regarding those messages or the messages themselves) and forward it back to the HTTP server 4020 which may include the report in the response. HTTP Server 4020 may also notify mailbox module 4040 of any delete headers received from the client 4070. The mailbox module 4040 may then delete the requested messages from the mailbox storage 4030. Upper layer applications 4050 may also query the status of the message, or of a device's mailbox from mailbox module 4040 (e.g., to determine if the message was sent and/or deleted).

Client 4070 may be any type of device, such as a smartphone, a tablet, a notebook computer, a desktop computer, a smart sensor device, network router, or other networked device. Client 4070 may be any type of electronic device which may connect to network 4060 and utilize a generic communication protocol such as HTTP. Client 4070 may include an HTTP client 4080 which may communicate with the HTTP server 4020 across network 4060. Client 4070 may be associated with one or more servers 4010 across network 4060 or additional networks (not shown). In some examples, the server 4010 and/or client 4070 may be configured to be associated with each other. In yet other examples, the client 4070 and/or the server 4010 may discover each other and form associations dynamically. In some examples, a client device may be associated with a server by having a mailbox for the device on the server.

Applications 4090 of the client may communicate with applications 4050 of the server by sending messages to the HTTP client 4080 for transmission through network 4060 and to HTTP server 4020. The messages are then passed by HTTP server 4020 to the upper layer applications 4050. HTTP server 4020 sends a reply message using standard HTTP protocols to the HTTP client 4080 through network 4060. The reply may include a list of messages awaiting the client 4070 in the mailbox storage 4020 as determined by the mailbox module 4040. This mailbox report information may be passed to mailbox module 4100 of the client which may parse the report and notify applications 4090 of the presence of one or more messages. Client applications 4090 may then desire to download one or more messages. In order to do this, the client applications 4090 may signal the mailbox module 4100 that it should download one or more of the messages. Mailbox module may utilize the meta data supplied in the previous message from the server 4010 to request one or more of the messages through HTTP client 4080 and network 4060. The HTTP Server 4020 may pass this request to the mailbox module 4040 who may reply with the appropriate message.

While the specification described using HTTP as the base message protocol, other messaging protocols may also be used. For example, any stateless messaging protocol may be extended with the techniques described herein. A stateless messaging protocol may be any messaging protocol in which any request from client to server must contain all of the information necessary to understand the request, and cannot take advantage of any stored context on the server. This may be contrasted with messaging protocols such as a Post Office Protocol (POP) which have distinct states that the server moves between when handling requests for messages. Additionally, messaging protocols which are substantially unidirectional in that one party to the communication may not spontaneously contact the other party (but may reply to the other party) may also be extended to allow the use of bi-directional messaging in this manner. Some communication protocols, such as HTTP, may be both stateless and substantially unidirectional.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 5:
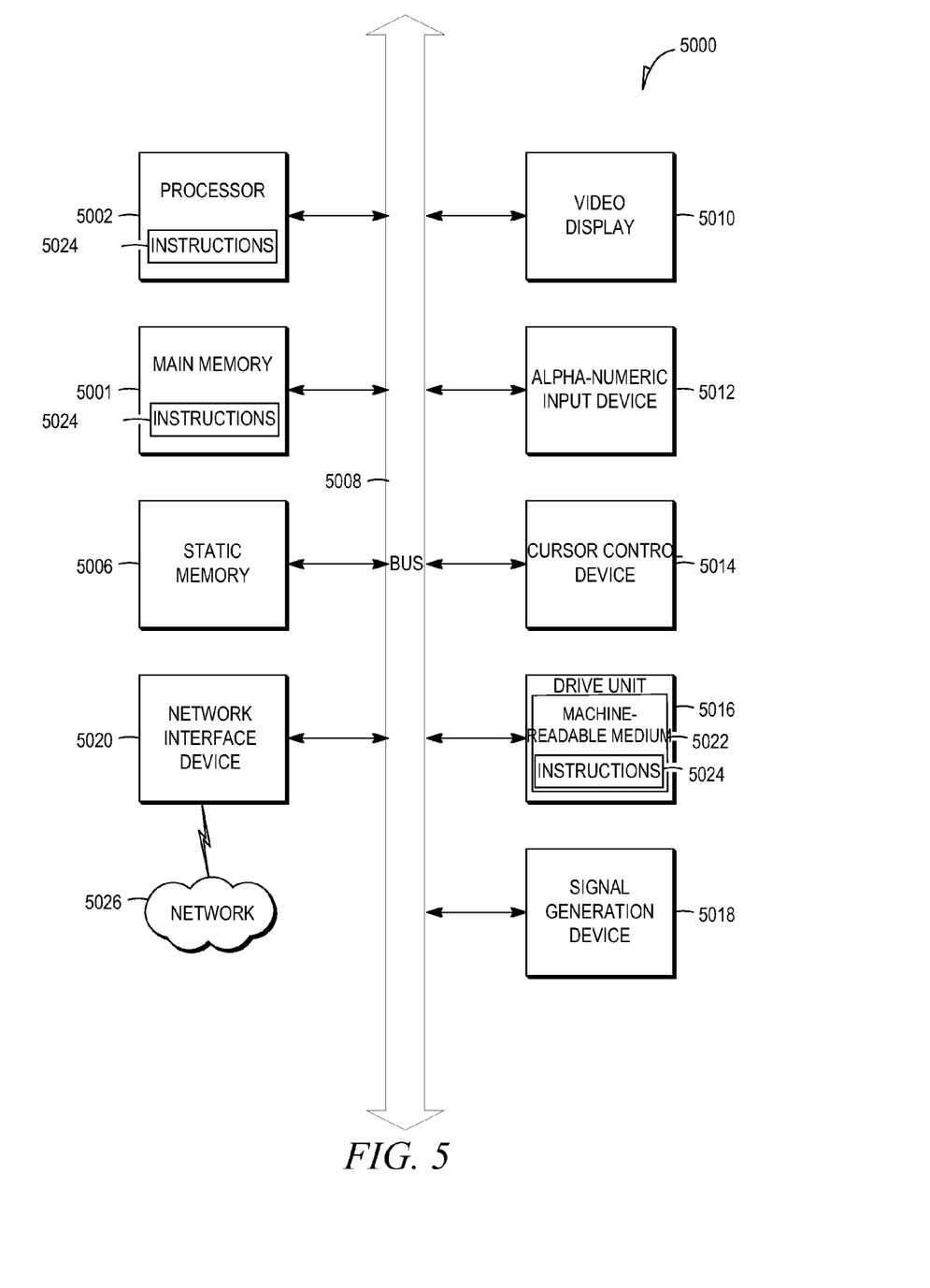
FIG. 5 shows a schematic of a machine according to some examples of the present disclosure.

FIG. 5 is a block diagram of machine in the example form of a computer system 5000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The client, server, or device as herein described may be, or include components of machine 5000.

The example computer system 5000 includes a processor 5002 (e.g., a central processing unit (CPU), a graphics processing unit (GPU) or both), a main memory 5004 and a static memory 5006, which communicate with each other via a bus 5008. The computer system 5000 may further include a video display unit 5010 (e.g., a liquid crystal display (LCD) or a cathode ray tube (CRT)). The computer system 5000 also includes an alphanumeric input device 5012 (e.g., a keyboard), a user interface (UI) navigation device 5014 (e.g., a mouse), a disk drive unit 5016, a signal generation device 5018 (e.g., a speaker) and a network interface device 5020.

Machine-Readable Medium

The disk drive unit 5016 includes a machine-readable medium 5022 on which is stored one or more sets of instructions and data structures (e.g., software) 5024 embodying or used by any one or more of the methodologies or functions described herein. The instructions 5024 may also reside, completely or at least partially, within the main memory 5004, static memory 5006, and/or within the processor 5002 during execution thereof by the computer system 5000, the main memory 5004 and the processor 5002 also constituting machine-readable media.

While the machine-readable medium 5022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 5024 may further be transmitted or received over a communications network 5026 using a transmission medium. The instructions 5024 may be transmitted using the network interface device 5020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

OTHER NOTES AND EXAMPLES

Example 1

A method for communications between a client and a server using a stateless messaging protocol comprising: transmitting from a client to a server a first message using the stateless messaging protocol; receiving from the server a response message, the response message including an indication of the presence of a second message at the server intended for the client, the indication including message retrieval information; sending a third message from the client to the server including the message retrieval information; and receiving a fourth message from the server, the fourth message including the contents of the second message.

Example 2

The method of example 1, wherein the stateless messaging protocol is a HyperText Transfer Protocol (HTTP).

Example 3

The method of any one of examples 1-2, wherein the message retrieval information comprises one of: a Uniform Resource Locator (URL) and a Uniform Resource Identifier (URI).

Example 4

The method of any one of examples 1-3, wherein the first message is a message requesting the indication of the availability of the second message.

Example 5

The method of any one of examples 1-3, wherein the first message is not a message requesting the indication of the availability of the second message.

Example 6

The method of any one of examples 1-5, wherein the first message is a message from higher level application layers of the client to higher level application layers of the server.

Example 7

The method of any one of examples 1-6, wherein the response message includes a status code indicating that the first message was received by the server.

Example 8

The method of any one of examples 1-7, wherein the first message includes a delete header indicating that the client wishes to delete a plurality of messages stored at the server and intended for the client.

Example 9

The method of example 8, wherein the delete header includes message retrieval information, the message retrieval information identifying the plurality of messages to delete.

Example 10

A device for communications with a server using a stateless messaging protocol comprising: a stateless messaging protocol client configured to: transmit from a client to a server a first message using the stateless messaging protocol; receive from the server a response message, the response message including an indication of the presence of a second message at the server intended for the device, the indication including message retrieval information; a mailbox module configured to: parse the indication of the presence of a second message, and instruct the stateless messaging protocol client to send a third message to the server including the message retrieval information; and wherein the stateless messaging protocol client is further configured to send the third message responsive to instructions from the mailbox module and to receive a fourth message from the server, the fourth message including the contents of the second message.

Example 11

The device of example 10, wherein the stateless messaging protocol is a HyperText Transfer Protocol (HTTP).

Example 12

The device of any one of examples 10-11, wherein the message retrieval information comprises one of: a Uniform Resource Locator (URL) and a Uniform Resource Identifier (URI).

Example 13

The device of any one of examples 10-12, wherein the first message is a message requesting the indication of the availability of the second message.

Example 14

The device of any one of examples 10-12, wherein the first message is not a message requesting the indication of the availability of the second message.

Example 15

The device of any one of examples 10-14, wherein the first message is a message from higher level application layers of the client to higher level application layers of the server.

Example 16

The device of any one of examples 10-15, wherein the response message includes a status code indicating that the first message was received by the server.

Example 17

The device of any one of examples 10-16, wherein the first message includes a delete header indicating that the client wishes to delete a plurality of messages stored at the server and intended for the client.

Example 18

The device of example 17, wherein the delete header includes message retrieval information, the message retrieval information identifying the plurality of messages to delete.

Example 19

A machine-readable medium including instructions which when performed by a machine, cause the machine to perform the operations of: transmitting from a client to a server a first message using a stateless messaging protocol; receiving from the server a response message, the response message including an indication of the presence of a second message at the server intended for the client, the indication including message retrieval information; sending a third message from the client to the server including the message retrieval information; and receiving a fourth message from the server, the fourth message including the contents of the second message.

Example 20

The machine-readable medium of example 19, wherein the stateless messaging protocol is a HyperText Transfer Protocol (HTTP).

Example 21

The machine-readable medium of any one of examples 19-20, wherein the message retrieval information comprises one of: a Uniform Resource Locator (URL) and a Uniform Resource Identifier (URI).

Example 22

The machine-readable medium of any one of examples 19-21, wherein the first message is a message requesting the indication of the availability of the second message.

Example 23

The machine-readable medium of any one of examples 19-21, wherein the first message is not a message requesting the indication of the availability of the second message.

Example 24

The machine-readable medium of any one of examples 19-23, wherein the first message is a message from higher level application layers of the client to higher level application layers of the server.

Example 25

The machine-readable medium of any one of examples 19-24, wherein the response message includes a status code indicating that the first message was received by the server.

Example 26

The machine-readable medium of any one of examples 19-25, wherein the first message includes a delete header indicating that the client wishes to delete a plurality of messages stored at the server and intended for the client.

Example 27

A method for communications between a client and a server using a stateless messaging protocol comprising: transmitting from a client to a server a first message using the stateless messaging protocol; receiving from the server a response message, the response message including the contents of a second message intended for the client and from a higher layer application on the server, wherein the second message is not a response to the first message.

Example 28

The method of example 27, wherein the stateless messaging protocol is a HyperText Transfer Protocol (HTTP).

Example 29

The method of any one of examples 27-28, wherein the first message includes a delete header indicating that the client wishes to delete a plurality of messages stored at the server and intended for the client.

Example 30

The method of example 29, wherein the delete header includes message retrieval information, the message retrieval information identifying the plurality of messages to delete.

Example 31

A device for communications with a client using a stateless messaging protocol comprising: a stateless messaging protocol client configured to: receive from a client to the server, a first message using the stateless messaging protocol; send a response message to the client in response to receiving the first message; a mailbox module configured to: receive a second message intended for the client from an upper layer application; store the message in a mailbox specific to the client; and wherein the stateless messaging protocol client is further configured to: send an indication of the presence of the second message and message retrieval information in the reply message; receive a third message including the message retrieval information; and responsive to determining that the message retrieval information identifies the second message, responding with the second message.

Example 32

The device of example 31, wherein the first message includes a delete header indicating that the client wishes to delete a plurality of messages stored at the server and intended for the client, wherein the mailbox module deletes the plurality of messages.

Example 33

The device of example 32, wherein the delete header includes message retrieval information, the message retrieval information identifying the plurality of messages to delete.

Example 34

The device of any one of examples 31-33, wherein the stateless messaging protocol is a HyperText Transfer Protocol (HTTP).

These examples can be combined in any permutation or combination. This overview is intended to provide an overview of subject matter of the present patent application. It is not intended to provide an exclusive or exhaustive explanation of the invention. The detailed description is included to provide further information about the present patent application.

What is claimed is:

1. A method for communications between a client and a server using a stateless messaging protocol comprising:
    transmitting from a client to a server a first message using the stateless messaging protocol;
    receiving from the server a response message, the response message including an indication of the presence of a second message at the server intended for the client, the indication including message retrieval information;
    sending a third message from the client to the server including the message retrieval information; and
    receiving a fourth message from the server, the fourth message including the contents of the second message.

2. The method of claim 1, wherein the stateless messaging protocol is a HyperText Transfer Protocol (HTTP).

3. The method of claim 1, wherein the message retrieval information comprises one of: a Uniform Resource Locator (URL) and a Uniform Resource Identifier (URI).

4. The method of claim 1, wherein the first message is a message requesting the indication of the availability of the second message.

5. The method of claim 1, wherein the first message is not a message requesting the indication of the availability of the second message.

6. The method of claim 1, wherein the first message is a message from higher level application layers of the client to higher level application layers of the server.

7. The method of claim 1, wherein the response message includes a status code indicating that the first message was received by the server.

8. The method of claim 1, wherein the first message includes a delete header indicating that the client wishes to delete a plurality of messages stored at the server and intended for the client.

9. The method of claim 8, wherein the delete header includes message retrieval information, the message retrieval information identifying the plurality of messages to delete.

10. A device for communications with a server using a stateless messaging protocol comprising:
    a stateless messaging protocol client configured to:
        transmit from a client to a server a first message using the stateless messaging protocol;
        receive from the server a response message, the response message including an indication of the presence of a second message at the server intended for the device, the indication including message retrieval information;
    a mailbox module configured to:
        parse the indication of the presence of a second message, and instruct the stateless messaging protocol client to send a third message to the server including the message retrieval information; and
    wherein the stateless messaging protocol client is further configured to send the third message responsive to instructions from the mailbox module and to receive a fourth message from the server, the fourth message including the contents of the second message.

11. The device of claim 10, wherein the stateless messaging protocol is a HyperText Transfer Protocol (HTTP).

12. The device of claim 10, wherein the message retrieval information comprises one of: a Uniform Resource Locator (URL) and a Uniform Resource Identifier (URI).

13. The device of claim 10, wherein the first message is a message requesting the indication of the availability of the second message.

14. The device of claim 10, wherein the first message is not a message requesting the indication of the availability of the second message.

15. The device of claim 10, wherein the first message is a message from higher level application layers of the client to higher level application layers of the server.

16. The device of claim 10, wherein the response message includes a status code indicating that the first message was received by the server.

17. The device of claim 10, wherein the first message includes a delete header indicating that the client wishes to delete a plurality of messages stored at the server and intended for the client.

18. The device of claim 17, wherein the delete header includes message retrieval information, the message retrieval information identifying the plurality of messages to delete.

19. A machine-readable medium including instructions which when performed by a machine, cause the machine to perform the operations of:
    transmitting from a client to a server a first message using a stateless messaging protocol;
    receiving from the server a response message, the response message including an indication of the presence of a second message at the server intended for the client, the indication including message retrieval information;
    sending a third message from the client to the server including the message retrieval information; and
    receiving a fourth message from the server, the fourth message including the contents of the second message.

20. The machine-readable medium of claim 19, wherein the stateless messaging protocol is a HyperText Transfer Protocol (HTTP).

21. The machine-readable medium of claim 19, wherein the message retrieval information comprises one of: a Uniform Resource Locator (URL) and a Uniform Resource Identifier (URI).

22. The machine-readable medium of claim 19, wherein the first message is a message requesting the indication of the availability of the second message.

23. The machine-readable medium of claim 19, wherein the first message is not a message requesting the indication of the availability of the second message.

24. The machine-readable medium of claim 19, wherein the first message is a message from higher level application layers of the client to higher level application layers of the server.

25. The machine-readable medium of claim 19, wherein the response message includes a status code indicating that the first message was received by the server.

26. The machine-readable medium of claim 19, wherein the first message includes a delete header indicating that the client wishes to delete a plurality of messages stored at the server and intended for the client.

27. A method for communications between a client and a server using a stateless messaging protocol comprising:
    transmitting from a client to a server a first message using the stateless messaging protocol;
    receiving from the server a response message, the response message including the contents of a second message intended for the client and from a higher layer application on the server, wherein the second message is not a response to the first message.

28. The method of claim 27, wherein the stateless messaging protocol is a HyperText Transfer Protocol (HTTP).

29. The method of claim 27, wherein the first message includes a delete header indicating that the client wishes to delete a plurality of messages stored at the server and intended for the client.

30. The method of claim 29, wherein the delete header includes message retrieval information, the message retrieval information identifying the plurality of messages to delete.

31. A device for communications with a client using a stateless messaging protocol comprising:
    a stateless messaging protocol client configured to:
        receive from a client to the server, a first message using the stateless messaging protocol;
        send a response message to the client in response to receiving the first message;
    a mailbox module configured to:
        receive a second message intended for the client from an upper layer application;
        store the message in a mailbox specific to the client; and
    wherein the stateless messaging protocol client is further configured to:
    send an indication of the presence of the second message and message retrieval information in the reply message;
    receive a third message including the message retrieval information; and
    responsive to determining that the message retrieval information identifies the second message, responding with the second message.

32. The device of claim 31, wherein the first message includes a delete header indicating that the client wishes to delete a plurality of messages stored at the server and intended for the client, wherein the mailbox module deletes the plurality of messages.

33. The device of claim 32, wherein the delete header includes message retrieval information, the message retrieval information identifying the plurality of messages to delete.

34. The device of claim 31, wherein the stateless messaging protocol is a HyperText Transfer Protocol (HTTP).

* * * * *